US007619773B2

(12) United States Patent
Haikin et al.

(10) Patent No.: US 7,619,773 B2
(45) Date of Patent: Nov. 17, 2009

(54) COLOR MANAGEMENT SYSTEM USING MEASURED DEVICE DATA (75) Inventors: John S. Haikin, Fremont, CA (US); Todd D. Newman, Palo Alto, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 489 days.

(21) Appl. No.: 11/503,070

(22) Filed: Aug. 14, 2006

(65) Prior Publication Data

US 2006/0274342 A1 Dec. 7, 2006

Related U.S. Application Data (62) Division of application No. 09/540,012, filed on Mar. 31, 2000, now Pat. No. 7,106,474.

(51) Int. Cl.
*G06F 15/00* (2006.01)

(52) U.S. Cl. .................. 358/1.9; 358/518; 382/162; 382/167

(58) Field of Classification Search .................. 358/1.9, 358/518; 382/167, 162
See application file for complete search history.

(56) References Cited

U.S. PATENT DOCUMENTS

| 5,208,911 | A | 5/1993 | Newman et al. ............ 345/600 |
| 5,257,097 | A | 10/1993 | Pineau et al. .............. 358/500 |
| 5,313,267 | A | 5/1994 | MacFarlane et al. ........ 356/405 |
| 5,365,353 | A | 11/1994 | Kraft ...................... 358/518 |
| 5,416,890 | A | 5/1995 | Beretta .................... 345/590 |
| 5,608,549 | A | 3/1997 | Usami ..................... 358/530 |
| 5,615,282 | A | 3/1997 | Spiegel et al. ............. 382/167 |
| 5,646,752 | A | 7/1997 | Kohler et al. ............. 358/520 |
| 5,748,858 | A | 5/1998 | Ohtsuka et al. ............ 358/1.9 |
| 5,754,184 | A * | 5/1998 | Ring et al. ................ 345/604 |
| 5,778,106 | A | 7/1998 | Juenger et al. ............ 382/275 |
| 5,806,081 | A | 9/1998 | Swen et al. ............... 715/528 |
| 5,818,960 | A | 10/1998 | Gregory et al. ............ 382/167 |
| 5,835,627 | A | 11/1998 | Higgins et al. ............ 382/167 |
| 5,949,962 | A | 9/1999 | Suzuki et al. ............. 395/109 |
| 5,999,703 | A | 12/1999 | Schwartz et al. .......... 395/109 |
| 6,037,950 | A | 3/2000 | Meir et al. ............... 345/427 |
| 6,062,137 | A | 5/2000 | Guo et al. ................ 101/171 |
| 6,088,038 | A | 7/2000 | Edge et al. ............... 345/600 |
| 6,108,442 | A | 8/2000 | Edge et al. ............... 382/167 |
| 6,128,415 | A | 10/2000 | Hultgren et al. ........... 382/276 |
| 6,249,315 | B1 | 6/2001 | Holm ...................... 348/251 |
| 6,282,313 | B1 | 8/2001 | McCarthy et al. .......... 382/162 |
| 6,343,295 | B1 | 1/2002 | MacLeod et al. ........ 707/103 R |

(Continued)

OTHER PUBLICATIONS

"Graphic technology—Color reflection target for input scanner calibration", NPES The Association for Suppliers of printing and Publishing Technologies, ANSI IT8.7/2-1993, Jun. 21, 1993, pp. 3, 12-14 and 18-29.

(Continued)

*Primary Examiner*—Twyler L Haskins
*Assistant Examiner*—Michael Burleson
(74) *Attorney, Agent, or Firm*—Fitzpatrick, Cella, Harper & Scinto (57) ABSTRACT

Managing color data to transform source color image data from a source device into destination color image data for rendering by a destination device, including accessing a source color data file corresponding to the source device, the source color data file containing source device color characteristic data, constructing a source color transform based on the source device color characteristic data contained in the source color data file, and applying the source color transform to the source color image data to transform the source color image data from a source device color space into interim color image data in an interim color space.

12 Claims, 9 Drawing Sheets

U.S. PATENT DOCUMENTS

| | | | |
|---|---|---|---|
| 6,362,808 B1 | 3/2002 | Edge et al. | 345/601 |
| 6,456,293 B1 | 9/2002 | Grandy | 345/591 |
| 6,456,340 B1 | 9/2002 | Margulis | 348/745 |
| 6,480,299 B1 | 11/2002 | Drakopoulos et al. | 358/1.9 |
| 6,549,210 B1 | 4/2003 | VanHook et al. | 345/561 |
| 6,603,483 B1 | 8/2003 | Newman | 346/593 |
| 6,628,822 B1 | 9/2003 | Nakabauashi | 382/162 |
| 6,628,826 B1 | 9/2003 | Gilman et al. | 382/167 |
| 6,633,668 B1 | 10/2003 | Newman | 382/166 |
| 6,671,067 B1 | 12/2003 | Adam et al. | 358/1.6 |
| 6,704,442 B2 | 3/2004 | Haikin et al. | 382/162 |
| 6,873,434 B1 | 3/2005 | Kohler et al. | 358/1.9 |
| 6,954,286 B1 | 10/2005 | Muramoto | 358/1.9 |
| 7,038,811 B1 | 5/2006 | Haikin | 358/1.9 |
| 2002/0154325 A1 | 10/2002 | Holub | 358/1.9 |
| 2003/0053682 A1 | 3/2003 | Haikin et al. | 382/162 |
| 2003/0053683 A1 | 3/2003 | Newman et al. | 382/162 |

OTHER PUBLICATIONS

Gill, Graeme W., "Argyll Color Management Project", Jul. 18, 2000 (visited Oct. 19, 2000), <http://www.web.access.net.au/argyll/argyllcmm.html>, 5 pages.

Gill, Graeme W., "Argyll Color Correction System: Simple CMYK Profile Generator", Nov. 9, 1996, 7 pages, 1996 ©.

Gill, Graeme W., "Argyll Color Correction System: Test Target Chart Generator", Sep. 28, 1996, 9 pages, 1996 ©.

Gill, Graeme W., "Argyll Color Correction System: PostScript Print Chart Generator Module", Sep. 28, 1996, 17 pages, 1996 ©.

Gill, Graeme W., "Argyll Color Correction System: DTP51 Target Chart Reader", Oct. 4, 1996, 11 pages, 1996 ©.

Gill, Graeme W., "Argyll Color Correction System: Scanin: Input the scan of a test chart, and output cgats data uses scanrd to do the hard work", Jan. 29, 1997, 9 pages, 1995 ©, 1996 © and 1997 ©.

Gill, Graeme W., "Argyll Color Correction System: CMYK Device Profile Generator", Feb. 15, 1997, 5 pages, 1996 ©, 1997 © and 2000 ©.

"File Format for Color Profiles", International Color Consortium® Specification ICC.1:1998-09, © 1998.

Fairchild, Mark, Tutorial Notes from The Seventh Color Imaging Conference, "T3, Color Appearance Modeling and CIECAM97s", pp. 7-9, Nov. 1999.

"Discussion on papers dealing with colour-profiles, file compression and colour management systems," Proceedings of the CIE Expert Symposium '96 Colour Standards for Image Technology, Mar. 25-27, 1996.

U.S. Appl. No. 11/203,162, filed Aug. 15, 2005 by Todd D. Newman and John S. Haikin, which was a division of U.S. Appl. No. 10/650,548, filed Aug. 28, 2003.

* cited by examiner

COLOR MANAGEMENT SYSTEM USING MEASURED DEVICE DATA

This application is a division of U.S. application Ser. No. 09/540,012, filed Mar. 31, 2000, the contents of which is incorporated herein by reference.

BACKGROUND OF THE INVENTION

1. Field of the Invention

The present invention relates to a color management system for transforming color data, wherein the color management system utilizes measured calorimetric data and viewing condition data corresponding to a source device for generating appropriate color transforms for use in a color transformation sequence to transform color image data into a destination device color space. In this manner, a color transform corresponding to the source device is not generated until it is required by a color management system for transforming color image data into a destination device color space.

2. Incorporation by Reference

Commonly-owned U.S. patent application Ser. No. 09/538,947, entitled "Standardized Device Characterization," by John S. Haikin, is incorporated herein by reference.

3. Description of the Related Art

Typically, color management systems provide a means for representing a color image that was produced by a source device on a destination device. The color characteristics of the source device and the destination device for rendering colors is usually different because the devices use different colorants to render the colors, such as a printer and a monitor, or are of different manufacturers such that colors are rendered according to different techniques. To accommodate the different color characteristics of the two different devices, a color management system is typically used to modify the color image data from the source device so that it can be rendered on the destination device so as to produce a color image which appears similar in nature as the color image rendered by the source device.

Figure 1:
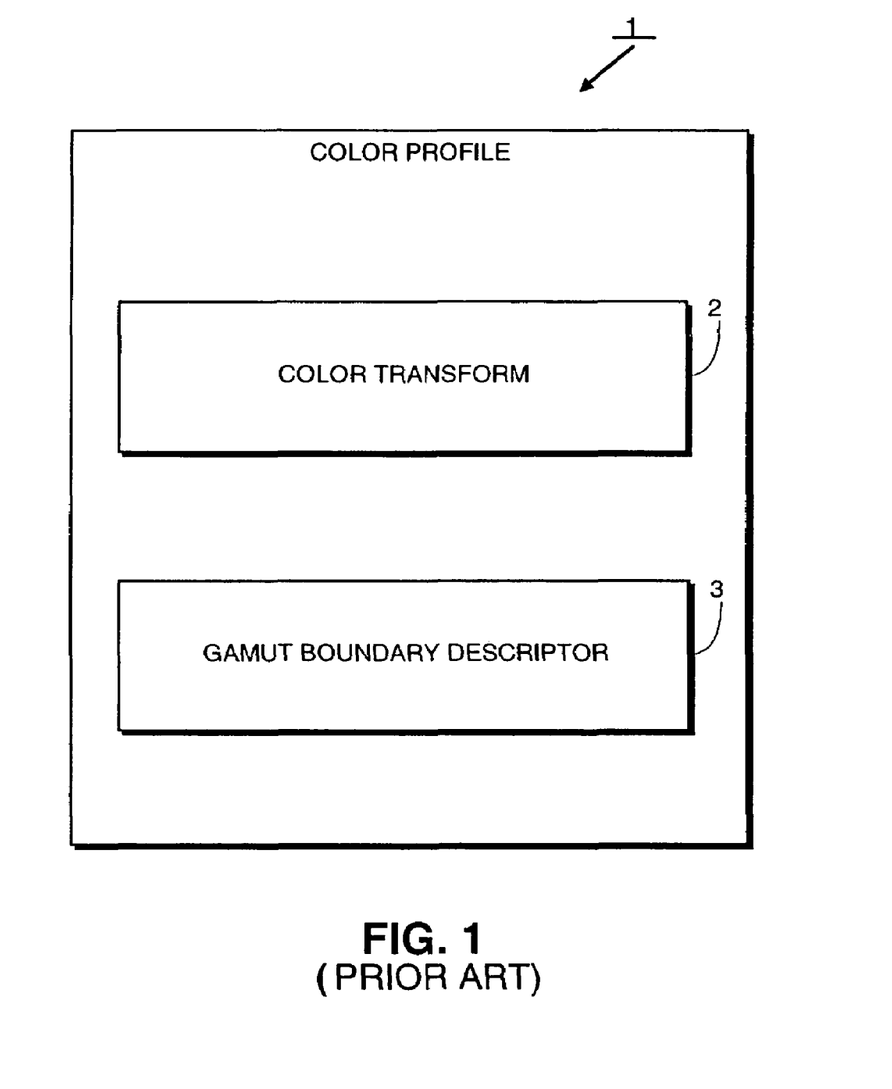
FIG. 1 is a diagram for explaining a typical device color profile used in conventional color management systems.

Many currently-used color management systems, such as those that support the International Color Consortium (ICC) specifications, use data files known as "device color profiles" to store information which reflects the color characteristics corresponding to a specific device. FIG. 1 depicts a device color profile 1 typically used in conventional color management systems. Specifically, the color characteristic information is provided in color transform 2 which reflects the color characteristics of the source device in relation to a standard, device-independent color space. The color transform can then be used to transform color image data from the source device color space into the device-independent color space as a first step in a comprehensive transformation sequence to ultimately generate color image data in destination device color space for rendering by the destination device. Color profile 1 also includes gamut boundary descriptor 3 which describes the gamut boundary of the device.

The color transform of a color profile corresponding to a particular device is typically in the form of color transformation data which is generated by a profile-building program. It should be noted that there are several different types of profile-building programs for generating color transformation data. A profile-building program constructs the color transformation data for a particular device from corresponding sets of input color value data and output color value data in conjunction with data reflecting expected viewing conditions. The corresponding sets of input color value data and output color value data reflect the color rendering characteristics of the device in relation to a standard, device-independent color space. The many different profile-building programs currently in use often utilize different methods and techniques to generate color transformation data, some of which are proprietary. For example, a profile-building program may incorporate a technique for generating color transformation data which produces the best result for a particular device or a particular type of image as determined by the manufacturer or developer of the profile-building program.

The color transformation data built by the profile-building program is then used to transform color data values from a source device color space to a particular, device-independent color space, and visa versa. Therefore, the construction of a color transform involves the selection of a particular color space and a color appearance model. Currently, there are several standard color spaces and color appearance models from which to select. In addition, the specifications for currently known, standard color spaces and color appearance models are in a state of rapid evolution. As a result, there currently exists a great number of profile-building programs for generating color transformation data based on different combinations of standard color spaces and color appearance models; and the number is rapidly increasing. In addition to the different choices of color spaces and color appearance models, there are many different ways to represent color transformation data in a device profile. For example, the color transformation data may be represented in a color look-up table, a polynomial function, or a sequence of single- and/or multi-variate transforms of arbitrary complexity.

To further complicate matters, many color management systems are designed to reduce processing overhead during the transformation of color image data by optimizing the color transformation data in order to increase the speed of the transformation process. The color transformation data is commonly optimized by eliminating a certain amount of unnecessary and/or less important color data as determined by the developer of the profile-building program. In addition, special proprietary functionality may be implemented into the profile-building program in order to provide more accurate color transformation from a source device color space to a destination device color space in order to achieve a preferred reproduction of the color image on the destination device. Therefore, it can be appreciated that the color transformation data contained in device color profiles corresponding to two separate devices may be quite different even though the two devices are very similar in nature, due to the use of two uniquely different profile-building programs to generate the color transformation data contained in each device color profile.

Device color profiles are typically structured in a standardized format in order to allow many different color management systems to use color profiles which were built by many different profile-building programs. The ICC has defined and standardized a color profile format in order to allow for the efficient interchange of color images from one device to another via color management systems. The ICC color profile format, however, is based on the assumption that the originator of the color image data in the source device knows what the best appearance of that color image data on a destination device should be, regardless of the actual destination device subsequently used to render the color image. This assumption is made because the ICC color profile format contains color transformation data which assumes a particular, standard color space and a particular appearance model for mapping (transforming) the color image data into that color appearance space.

Currently, digital color image data is widely used in computer and networked computing environments, and the use of such color image data is growing rapidly. Color image data corresponding to color images are often archived or placed into stock photography banks for subsequent access and utilization by other users. The use of such color image data by a subsequent user can present significant problems when the subsequent user attempts to transform the color image data into the color space of a destination device for rendering a preferred reproduction of the color image. In addition, the color image data, which is tagged with an ICC color profile corresponding to the source device, may be accessed from a stock photography bank for use by a subsequent user long after the color image data was created. In such a situation, the source color profile may be many revisions old or, if enough time has gone by, the ICC color profile format may no longer be used by color management systems. In such situations, the color image data is effectively unusable by the subsequent user because the subsequent user's color management system cannot interpret the source color profile for use in a transformation sequence. Even if the source color profile can be subsequently used by a color management system, the color transformation data in the color profile may have been based on a standard color space or a color appearance model that is either incompatible or sub-optimal when used in conjunction with color transformation data from the color profile of the destination device.

In addition to the above problems, the representation of the color transformation data in the source device color profile may have been implemented in a particular manner, such as a three-dimensional color look-up table, which is not sufficiently accurate to generate an optimal color transformation sequence. Moreover, even if the source device color profile associated with the color image data and the destination device color profile are fully compatible, a subsequent user of the color image data may wish to generate a different, preferred appearance of the color image, often referred to as a preferred reproduction. Such a preferred reproduction is typically not possible, or is very difficult, when using conventional color profiles because a source device color profile corresponding to the color image data incorporates a particular color space and a particular color appearance model in the color transform.

SUMMARY OF THE INVENTION

The present invention addresses the foregoing problems by providing a color management system for transforming source color image data, wherein the color management system directly accesses and utilizes a source device color data file containing source device color characteristic data and viewing condition data and then constructs an appropriate source color transform for use in a color transformation sequence to transform source color image data into a destination device color space.

According to one embodiment of the invention, a color management system is provided to transform source color image data from a source device into destination color image data for rendering by a destination device. A source color data file corresponding to the source device is accessed, the source color data file containing source device color characteristic data, a source color transform is constructed based on the source device color characteristic data contained in the source color data file, and the source color transform is applied to the source color image data to transform the source color image data from a source device color space into interim color image data in an interim color space.

Preferably, the source color data file is in a predetermined format having tags corresponding to the source device color characteristic data. A set of viewing condition data is preferably also included in corresponding tags of the source color data file. The source color transform is preferably either applied directly to the source color image data or incorporated into a color transformation sequence for application to the source color image data. Preferably, the source device color characteristic data contains measured calorimetric data and corresponding device signal data. In the alternative, the source device color characteristic data represents spectral measurement data corresponding to the source device.

By virtue of this arrangement, a color management system is provided whereby raw calorimetric measurement and device signal data corresponding to a source device is stored in a standardized, formatted color data file for subsequent use by a color management system to generate a source device color transform. In this manner, the color management system is not forced to use a color transform that was originally created when the color image data was generated by the source device. A subsequent user of the color image data is therefore free to use a color management system having a preferred combination of a color space, a color appearance model and a desired set of viewing conditions in order to create a source device color transform. Accordingly, a source device color transform does not have to be created until the color image data is subsequently accessed for use by a subsequent user. In this manner, a set of color image data is associated with a corresponding source color data file that contains color characteristic data of the source device in a well recognized, robust format for use by a variety of current, and not yet known, color management systems.

According to another embodiment of the invention, a color management system is provided for managing color data to transform source color image data from a source device into destination color image data for rendering by a destination device. A source color data file corresponding to the source device is accessed, the source color data file being formatted according to a standard predetermined format and having a plurality of tags containing source device color characteristic data and a set of viewing condition data corresponding to a set of viewing conditions in which the source device color characteristic data was measured. A source color transform is constructed based on the source device color characteristic data and the set of viewing condition data by utilizing an interim color space and a color appearance model, the source color transform for transforming the source color image data from a source device color space into an interim color space. The source color transform is incorporated in a color transformation sequence which is applied to the source color image data to transform the source color image data from the source device color space into a destination device color space.

Preferably, the source color data file is in a predetermined format having tags corresponding to the source device color characteristic data. A set of viewing condition data is preferably also included in corresponding tags of the source color data file. The source color transform is preferably either applied directly to the source color image data or incorporated into a color transformation sequence for application to the source color image data. Preferably, the source device color characteristic data contains measured calorimetric data and corresponding device signal data. In the alternative, the source device color characteristic data contains spectral measurement data corresponding to the source device.

By virtue of this arrangement, a color management system is provided whereby raw calorimetric measurement and device signal data corresponding to a source device is stored in a standardized, formatted color data file for subsequent use by a color management system to generate a source device color transform. In this manner, the color management system is not forced to use a color transform that was originally created when the color image data was generated by the source device. A subsequent user of the color image data is therefore free to use a color management system having a preferred combination of a color space, a color appearance model and a desired set of viewing conditions in order to create a source device color transform. Accordingly, a source device color transform does not have to be created until the color image data is subsequently accessed for use by a subsequent user. In this manner, color image data is identified with a corresponding source color data file that contains color characteristic data of the source device in a well recognized, robust format for use by a variety of current, and not yet known, color management systems.

According to yet another embodiment of the invention, a memory is provided for access by a color management system, the color management system for transforming source color image data from a source device into destination color image data for rendering by a destination device. The memory includes a calorimetric data structure stored in the memory, the calorimetric data structure being formatted according to a predetermined format and containing a set of device color characteristic data elements representing a set of color characteristics of a color device and a set of viewing condition data elements representing a set of viewing conditions of a color device.

Preferably, the calorimetric data structure is in a predetermined format having tags corresponding to the device color characteristic data elements. A set of tags corresponding to the viewing condition data elements is preferably also included. Preferably, the device color characteristic data elements are represented in CIE XYZ color space or a linear transform thereof. In the alternative, the device color characteristic data elements contain spectral measurement data elements representing spectral measurement values corresponding to a color device. The memory having the colorimetric data structure is preferably in the form of a computer-readable medium such as a hard disk, floppy disk, CD-ROM or a file in a file server which is accessible via the internet.

By virtue of this arrangement, raw calorimetric measurement data corresponding to a color device is stored in a standardized, formatted color data file for subsequent use by a color management system to generate a source device color transform. In this manner, a color management system is not forced to use a color transform that was originally created when the color image data was generated in the source device. A subsequent user of the color image data is therefore free to use a color management system having a preferred combination of a color space, a color appearance model and a set of desired viewing conditions in order to create a source device color transform. The aforementioned features provide subsequent users with the ability to control the type of source color transform used in transforming the color image data into another color space. Furthermore, a set of color image data is associated with a corresponding color data file that contains color characteristic data of the source device in a well recognized, robust format for use by a variety of current, and not yet known, color management systems.

Another embodiment of the present invention provides a memory for access by a color management system, the color management system for transforming source color image data from a source device into destination color image data for rendering by a destination device. The memory includes a set of source color image data stored in the memory, and a calorimetric data structure stored in the memory, the colorimetric data structure formatted according to an extended CGATS/IT8 format including a set of tags corresponding to a set of device color characteristic data elements representing a set of measured color characteristics of the source device, and including a set of tags corresponding to a set of viewing condition data elements representing a set of viewing conditions in which the device color characteristic data elements were measured.

Preferably, the device color characteristic data elements are represented in CIE XYZ color space or a linear transform thereof. In the alternative, the device color characteristic data elements contain spectral measurement data elements representing spectral measurement values corresponding to the source device. The memory having the calorimetric data structure is preferably in the form of a computer-readable medium such as a hard disk, floppy disk, CD-ROM or a file in a file server which is accessible via the internet.

By virtue of this arrangement, raw calorimetric measurement data corresponding to a color device is stored in a standardized, formatted color data file for subsequent use by a color management system to generate a source device color transform. In this manner, a color management system is not forced to use a color transform that was originally created when the color image data was generated in the source device. A subsequent user of the color image data is therefore free to use a color management system having a preferred combination of a color space, a color appearance model and a set of desired viewing conditions in order to create a source device color transform. The aforementioned features provide subsequent users with the ability to control the type of source color transform used in transforming the color image data into another color space. Furthermore, a set of color image data is associated with a corresponding color data file that contains color characteristic data of the source device in a well recognized, robust format for use by a variety of current, and not yet known, color management systems.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

The present invention is generally directed to a color management system for transforming source color image data, wherein the color management system directly accesses and utilizes a source device color data file containing source device color characteristic data and viewing condition data and then constructs an appropriate source color transform for use in a color transformation sequence to transform source color image data into a destination device color space. In this manner, source color image data can be archived and an associated source color transform is not constructed until it is subsequently needed by a color management system for transforming the source color image data into a destination device color space. A subsequent user of the archived source color image data can thereby select and/or control the type of color management system used to construct the source color transform based upon a desired combination of a color appearance space, a color appearance model and a desired set of viewing conditions. The present invention may be implemented in an output device driver, such as a printer driver contained in a computing device, or the present invention may be implemented in a color management software application module for use in a general purpose computer. It can be appreciated that the present invention is not limited to the aforementioned embodiments and that the present invention may be implemented in other forms as well.

Figure 2:
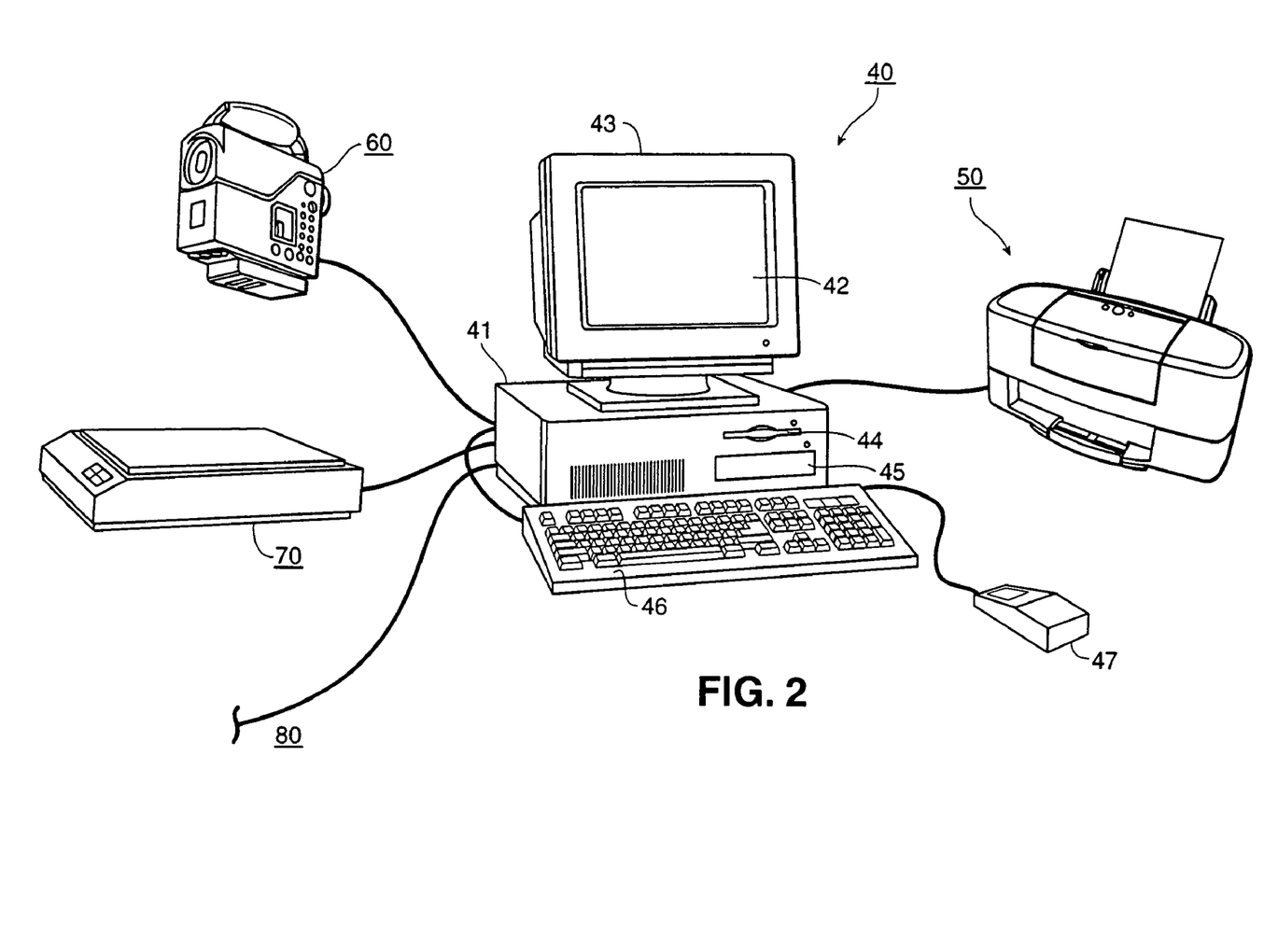
FIG. 2 is a representative view of a networked computer system in which the present invention may be implemented.

FIG. 2 is a view showing the external appearance of a representative computing system including computing equipment, peripherals and digital devices which may be used in connection with the practice of the present invention. Computing equipment 40 includes host processor 41 which comprises a personal computer (hereinafter "PC"), preferably an IBM PC-compatible computer having a windowing environment such as Microsoft Windows 2000, Windows NT, Windows 98 or Windows 95, although it may be a Macintosh or a non-windows-based computer. Provided with computing equipment 40 are color monitor 43 including display screen 42, keyboard 46 for entering text data and user commands, and pointing device 47. Pointing device 47 preferably comprises a mouse for pointing and for manipulating objects displayed on display screen 42.

Computing equipment 40 includes a computer-readable memory medium such as computer fixed disk 45 and/or floppy disk drive 44. Floppy disk drive 44 provides a means whereby computing equipment 40 can access information, such as image data, computer-executable process steps, application programs, etc. stored on removable memory media. A similar CD-ROM interface (not shown) may be provided for computing equipment 40 through which computing equipment 40 can access information stored on removable CD-ROM media.

Printer 50 is a printer, preferably a color bubble jet printer, which forms color images on a recording medium such as paper or transparencies or the like. The invention is usable with other printers, however, so long as the printer is capable of being interfaced to computing equipment 40. In addition, digital color scanner 70 is provided for scanning documents and images into computing equipment 40 and digital color camera 60 is provided for sending digital images to computing equipment 40. Of course, computing equipment 40 may acquire digital image data from other sources such as a digital video camera or from a local area network or the Internet via network interface bus 80.

Figure 3:
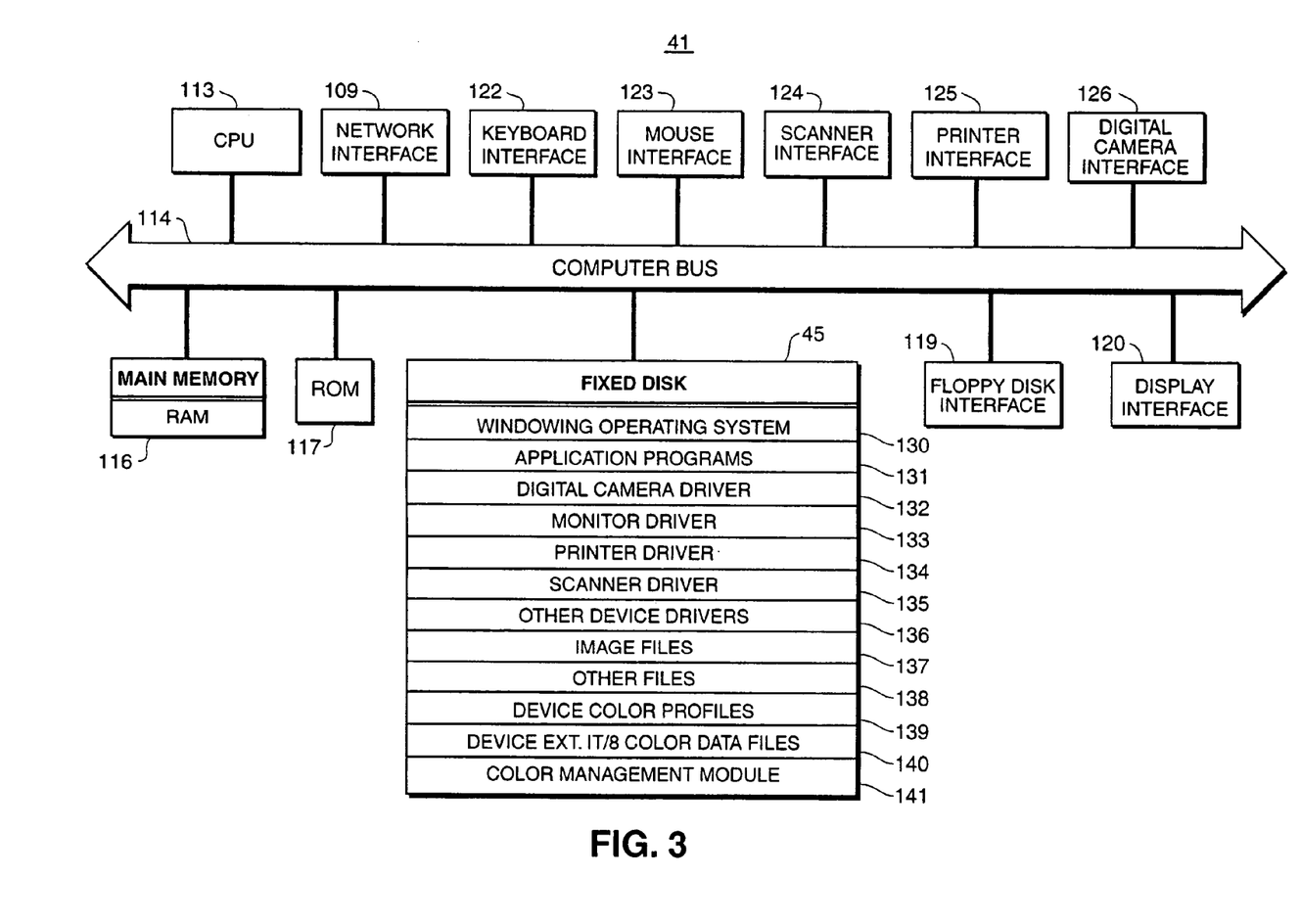
FIG. 3 is a detailed block diagram for providing an explanation of the internal architecture of the computer equipment shown in the computer system of FIG. 1.

FIG. 3 is a detailed block diagram showing the internal architecture of host processor 41 of computing equipment 40. As shown in FIG. 3, host processor 41 includes central processing unit (CPU) 113 which interfaces with computer bus 114. Also interfacing with computer bus 114 are fixed disk 45, network interface 109, random access memory (RAM) 116 for use as main memory, read only memory (ROM) 117, floppy disk interface 119, display interface 120 to monitor 43, keyboard interface 122 to keyboard 46, mouse interface 123 to pointing device 47, scanner interface 124 to scanner 70, printer interface 125 to printer 50, and digital camera interface 126 to digital camera 60.

Main memory 116 interfaces with computer bus 114 so as to provide RAM storage to CPU 113 during execution of software programs such as an operating system, application programs and device drivers. More specifically, CPU 113 loads computer-executable process steps from fixed disk 45, another storage device, or some other source such as a network, into a region of main memory 116. CPU 113 then executes the stored process steps from main memory 116 in order to execute software programs such as an operating system, application programs and device drivers. Data such as color images can be stored in main memory 116, where the data can be accessed by CPU 113 during the execution of computer-executable process steps which use or alter the data.

As also shown in FIG. 3, fixed disk 45 contains operating system 130, which is preferably a windowing operating system although other operating systems may be used, application programs 131, such as image processing applications that include a color management module, and plural device drivers, including a digital camera driver 132, monitor driver 133, printer driver 134, scanner driver 135, and other device drivers 136. Fixed disk 45 also includes image files 137, other files 138, device color profiles 139, which are discussed in more detail below, device extended IT8 color data files 140, which are also discussed in more detail below, and color management module 141 in which the present invention may be implemented. The functions of color management module 141 are preferably provided in the form of computer-executable process steps. As mentioned above, the functions of color management module 141 may be alternatively integrated into an output device driver, such as printer driver 134, or into an application program for performing processing of color image data, such as one of application programs 131.

Figure 4:
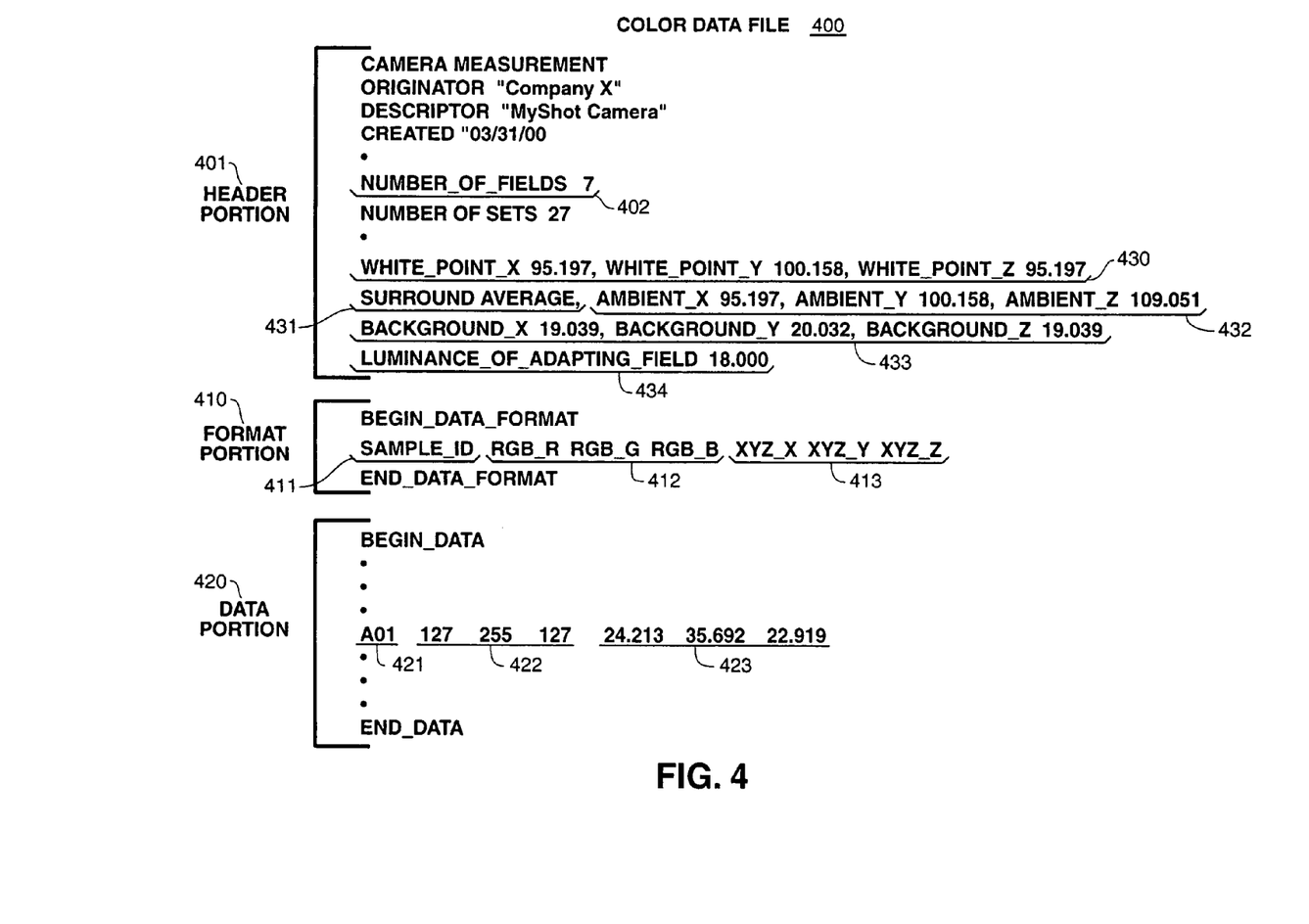
FIG. 4 is a view for illustrating a color data file according to one embodiment of the present invention.

FIG. 4 is a view for illustrating one embodiment of a color data file according to the present invention. In contrast to the device color profile of FIG. 1, the color data file depicted in FIG. 4 contains raw color characteristic data and viewing condition data corresponding to a color device. In this manner, a subsequent user of an archived color image is not forced to use a previously-generated color transform corresponding to the source device that created the archived color image. Instead, the color data file of the present invention allows a subsequent user of the archived color image to select and use a color management system having a preferred combination of a color space, a color appearance model and a set of desired viewing conditions in order to create a source device color transform for use in transforming the archived color image data into the color space of a particular destination device.

The color data file of the present invention is preferably a formatted file containing tags for the various data elements included therein, including tags for the raw color characteristic data and viewing condition data corresponding to a color device. Currently, a standardized data file format, known as CGATS/IT8, exists for storing color characteristic data corresponding to a color device. The CGATS/IT8 standard includes tags for storing measured calorimetric data corresponding to a color device. For example, the CGATS/IT8 format can be used in a calorimetric measurement scenario in which an array of color patches generated by a color device is measured and the measured calorimetric data corresponding to each color patch is stored in a color data file having the CGATS/IT8 format. In this manner, the calorimetric data is stored in a standardized fashion for future reference and use.

None of the CGATS/IT8 standards provide tags for containing both device control signals of the color device and corresponding measured calorimetric data. For example, it is often desirable to correlate a set of printer input signals to a set of calorimetric data measured from the rendered color image that was generated in response to the printer input signals. These correlated sets of data can then be used to generate a color transform for modeling the printer's color characteristics and capabilities. In this regard, commonly-owned U.S. patent application Ser. No. 09/538,947, entitled "Standardized Device Characterization," by John S. Haikin, provides an extended CGATS/IT8 format standard which includes tags for containing device control signals of a color device, in addition to the other extensions described therein. In a similar manner, the present invention utilizes extensions to the CGATS/IT8 format including tags for device control signal data as well as tags for viewing condition data. In this manner, the extended CGATS/IT8 format of the present invention contains color characteristic data and viewing condition data corresponding to a color device for use in the subsequent creation of a color transform corresponding to the color device.

Turning to FIG. 4, a color data file corresponding to the present invention is depicted. It can be seen from FIG. 4 that color data file 400 is organized in a formatted fashion corresponding to a predetermined format so as to include header portion 401, format portion 410 and data portion 420. Header portion 401 includes a format descriptor to describe the format of color data file 400, which in this example is a format for camera color characteristic data. An indication of the originator of the data contained in color data file 400 is also included as well as a descriptor for describing the data contained therein. Header Portion 401 also includes a creation date.

Header Portion 401 further includes NUMBER_OF_FIELDS 402 which indicates the different types of data provided in color data file 400 corresponding to each particular color measurement. In this case, NUMBER_OF_FIELDS 402 has a value of 7 corresponding to the fields for SAMPLE_ID 411, RGB data 412, and XYZ data 413. As illustrated in Format Portion 410, SAMPLE_ID 411 is a field for containing an identification of the particular color sample which is being measured. RGB data 412 includes red, green and blue data corresponding to device signals for a particular color device being measured. As discussed above, when measuring calorimetric data for a printer, RGB data 412 represents the three RGB input printer signals for directing the printer to print a color image. XYZ data 413 includes X, Y and Z components of measured colorimetric data corresponding to a color device. As discussed above, when the color characteristics of a printer are being measured, XYZ data 413 represents the three measured color values of the printed color image. In the case of a scanner, RGB data 412 represents output signals from the scanner in response to scanning of a color image, and XYZ data 413 represents the measured calorimetric data of the color image being scanned. In this manner, both input and output color data corresponding to a color device are provided within one file for subsequent access and used to characterize and/or model the color capabilities of the color device.

Header Portion 401 also includes WHITE_POINT data 430, SURROUND data 431, AMBIENT data 432, BACKGROUND data 433 and LUMINANCE_OF_ADAPTING_FIELD data 434 for representing a set of viewing conditions. Preferably, the viewing conditions represent the viewing conditions measured at the time that the device signal data elements, such as RGB data 412, and the measured calorimetric data elements, such as XYZ data 413, were recorded. In this manner, the viewing conditions in which the color device was measured can be stored in the same file with the device signal data and measured colorimetric data for future use.

WHITE_POINT data 430 is a white point calorimetric specification corresponding to the viewing condition white point. AMBIENT data 432 is an ambient colorimetric specification corresponding to ambient viewing conditions. SURROUND data 431 corresponds to surround calorimetric specification for representing the remainder of the visual field outside the background surrounding the color sample being measured. BACKGROUND data 433 corresponds to background calorimetric specification for a background of the color sample being measured. The background commonly includes an area immediately adjacent to the point being measured out to approximately 10 degrees. LUMINANCE_OF_ADAPTING_FIELD 434 represents an adapting field colorimetric specification corresponding to the state of adaption of a scene in which the sample point is being measured. Such viewing condition measurements are commonly known in the art of color management. The aforementioned array of viewing conditions enables a subsequent user of color data file to properly use the color characteristic data contained in color data file 400 for constructing a proper characterization of the color device to which color data file 400 corresponds. For example, if color data file 400 corresponds to a printer, then RGB data 412, XYZ data 413, and viewing condition data 430 to 434 can be accessed and utilized in order to create a proper color transform for transforming color image data generated by the printer into another color space, such as a profile connection space.

Data portion 420 of color data file 400 is seen to have corresponding data values for each of the aforementioned fields described in Format Portion 410. Specifically, a row of data in data portion 420 corresponds to a measured color image sample identified as A01 for SAMPLE_ID 421. Similarly, device signal data represented by RGB data 412 is provided in RGB values 422, and measured calorimetric data represented by XYZ data 413 is provided in XYZ data 423.

In this embodiment, RGB data 412 and XYZ data 413 represent device signal data and measured calorimetric data, respectively. In the alternative, these fields can be used to contain spectral measurement values corresponding to the color device. In addition, viewing condition fields 430 to 434 can be used to represent a desired set of viewing conditions in the case that RGB data 412 and XYZ data 413 contain spectral measurement values. In this manner, color data file 400 has the flexibility to represent color characteristic data of a color device in different forms.

Figure 5:
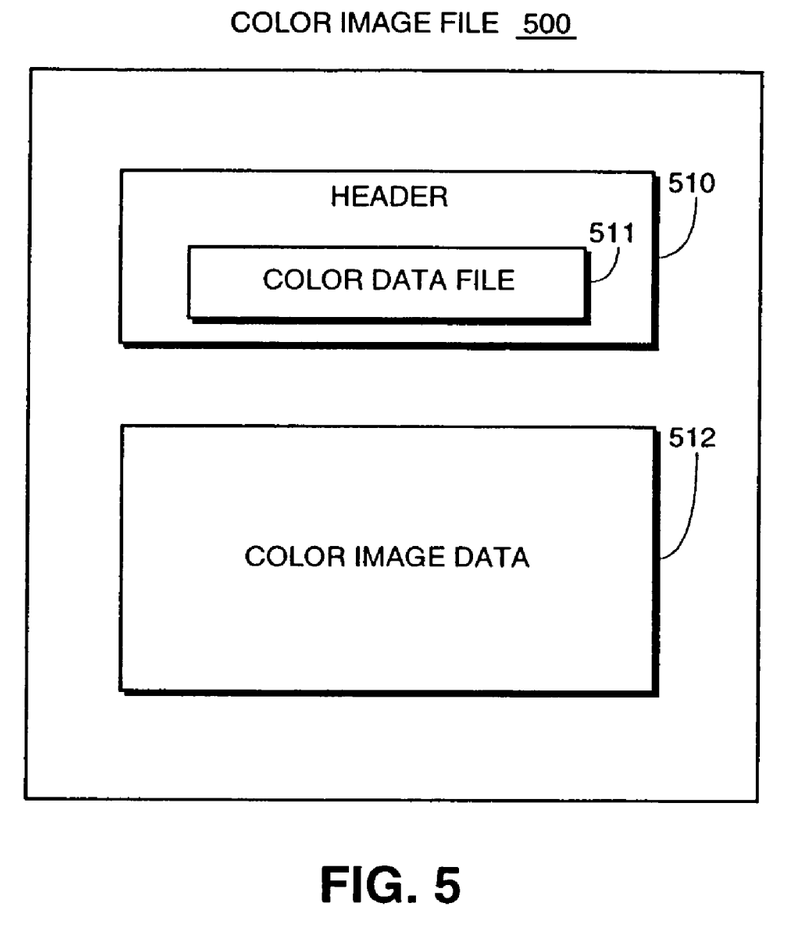
FIG. 5 is a detailed block diagram for providing an explanation of an embedded color data file according to one embodiment of the present invention.

It can be appreciated that color data file 400 can be maintained in a memory area, such as a floppy disk, hard disk, CD-ROM, or a network server for access in a networked computing environment, including the Internet and World Wide Web. Preferably, color data file 400 is embedded in a color image file containing a set of color image data for representing a color image. In this regard, FIG. 5 depicts color image file 500 in which color data file 511 is embedded. In particular, color image file 500 includes header 510 and color image data 512 which corresponds to a color image. Header 510 includes a tag for containing color data file 511, color data file 511 corresponding to a color data file as depicted in FIG. 4. In this manner, color data file 511 corresponds to the source color device, such as a digital camera or scanner, which generated color image data 512. Color image file 500 therefore provides a convenient package for combining color image data 512 with the color characteristic and viewing condition data corresponding to the source color device which generated color image data 512. It can be appreciated that color image file 500 is beneficial for storing and archiving color image data such that, regardless of the amount of time elapsed since the generation of color image data 512, a subsequent user can access color image file 500 and then access and utilize the color characteristic data and viewing condition data contained in color data file 511 to create an appropriate color transform for use in working with color image data 512. In this manner, a subsequent user of color image data 512 is not constrained to using an outdated color transform corresponding to color image data 512, or a color transform which produces sub-optical results with the subsequent user's color management system.

Figure 6:
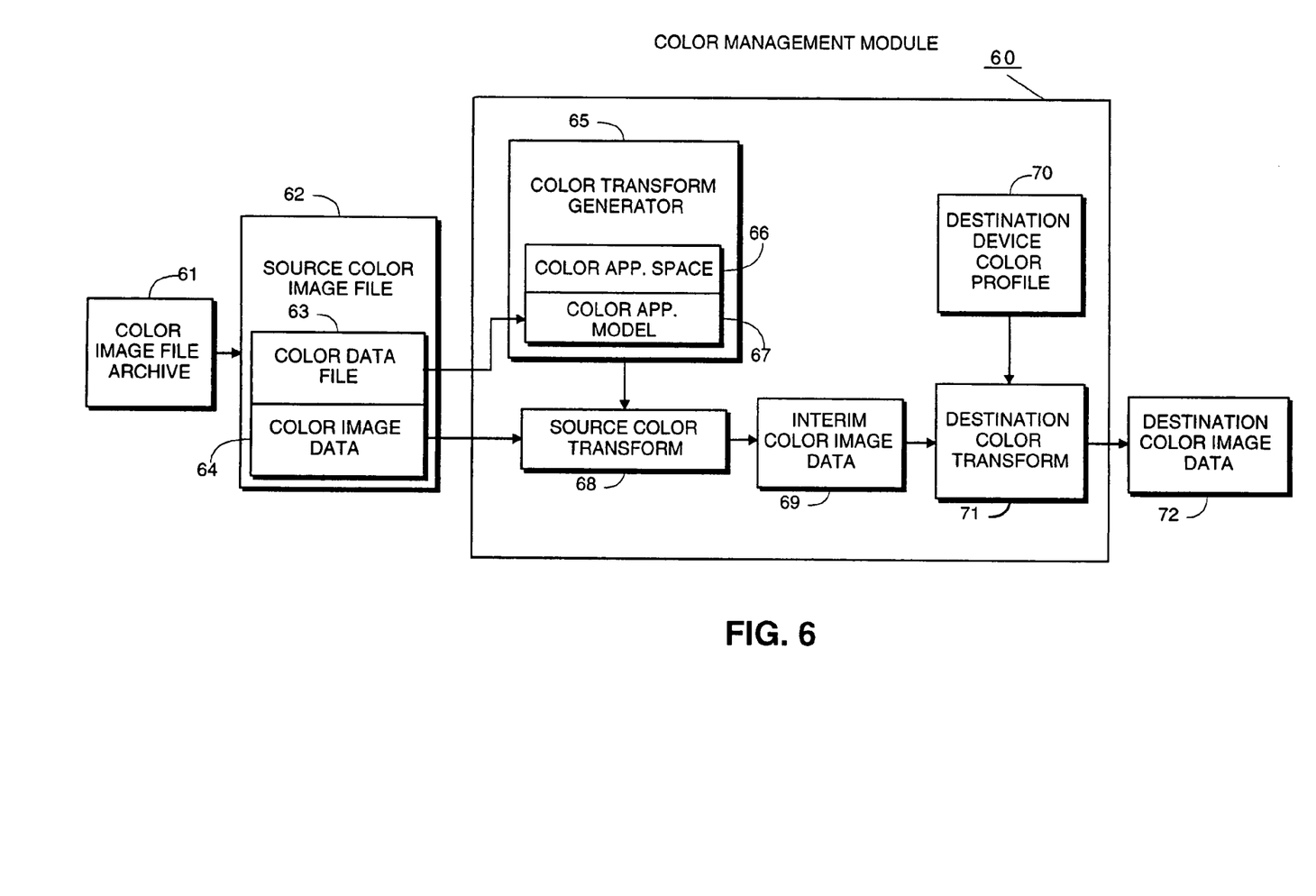
FIG. 6 is a detailed block diagram for providing an explanation of a color management system according to one embodiment of the present invention.

FIG. 6 provides a detailed block diagram for illustrating the use of a color data file according to the present invention in a color management system. Turning to FIG. 6, it can be seen that source color image file 62 is accessed from color image archive 61 for use by a subsequent user. For example, a graphic artist may browse color image archive 61 and choose source color image file 62 corresponding to a color image that the graphic artist wishes to use in a composition image. Source color image file 62 contains color data file 63 corresponding to a source device as described in FIG. 4 and also contains color image data 64. In this example, source color image file 62 corresponds to a source device, and color image data 64 is in the RGB color space associated with the source device (digital camera or scanner).

Color management module 60 is then utilized for performing color management of color image data 64 contained in source color image file 62. Specifically, as discussed above, a subsequent user of source color image file 62 can select and/or control a preferred color management module depending on the color appearance space and color appearance model that the subsequent user wishes to apply to create a source color transform from color data file 63. As represented in FIG. 6, color data file 63 is passed to color transform generator 65 which is a function of color management module 60. Color transform generator 65 utilizes color appearance space 66 and color appearance model 67 in order to construct source color transform 68 based on the source device color characteristic data and viewing condition data contained in color data file 63 as depicted in FIG. 4.

In particular, device signal data represented by RGB data and measured calorimetric data represented by XYZ data are accessed from color data file 63 for use by color transform generator 65. In addition, viewing condition data is accessed from color data file 63 for use in conjunction with the device signal data and measured colorimetric data in order to generate source color transform 68 for transforming color image data 64 into color appearance space 66. In this example, color appearance space 66 is a profile connection space. In addition, color appearance model 67 is used to define the source color transform 68. Source color transform 68 may be represented in the form of a look-up table, or in other forms, such as a polynomial function, a single-variate transform, or a multi-variate transform. In addition, it can be appreciated that color appearance space 66 can be any one of a number of different types of color appearance spaces such as a CIE Lab color space, or a color space composed of a lightness component, and two orthogonal color components for defining a chroma and a hue, such as Jch and Jab color spaces. The present invention is not limited to the use of the aforementioned color appearance spaces, and it can be appreciated that other color appearance spaces may be used, including other types of device-independent color spaces.

Color transform generator 65 of color management module 60 generates source color transform 68 in accordance with a particular color transform generation method and/or algorithm. It can be appreciated that color management module 60 may implement any one of a different number of color transform generation methods and/or algorithms. Such color transform generation methods and/or algorithms may include one or more optimization functions for optimizing source color transform 68 to enable source color transform 68 to process color image data 64 in a more efficient fashion, to process color image data 64 so as to achieve greater accuracy in the reproduction of color image data 64, or to process color image data 64 to achieve a particular preferred reproduction of color image data 64.

Source color transform 68 is then applied to color image data 64 in order to create interim color image data 69, which in this example is in a profile connection space, thereby allowing interim color image data 69 to be further processed by other color transforms which are also in the profile connection space. Source color transform 68 can also be stored in a memory such as a floppy, hard disk, CD-ROM or the like for subsequent access by a user in order to reduce subsequent processing of color image data 64 or of other color image data files generated from the same source device. In the example illustrated in FIG. 6, interim color image data 69 is further transformed by destination color transform 71 which was accessed from a typical destination device color profile 70. It can be appreciated that destination color transform 71 may alternatively be generated by color transform generator 65 if a destination color data file similar to source color data file 63 exists for the particular destination device. In any event, whether destination color transform 71 is accessed from destination device color profile 70 or is generated from color transform generator 65, interim color image data 69 is transformed into destination color image data 72. In this example, destination device color profile 70 corresponds to an ink jet printer, and destination color transform 71 therefore transforms the color image data into a CMYK color space. Destination color image data 72 can then be rendered by the destination device, which in this case is a printer.

Figure 7:
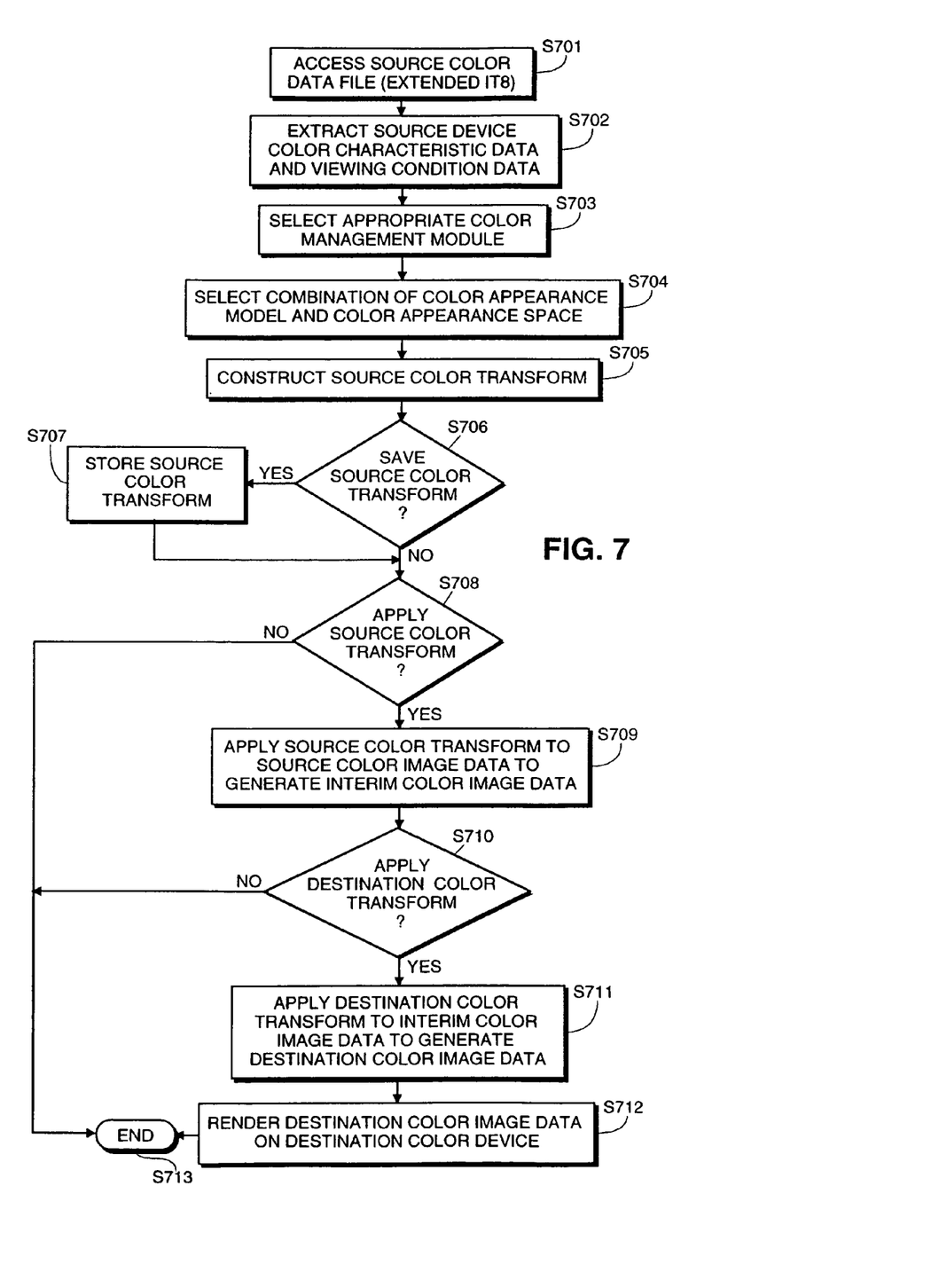
FIG. 7 is a flowchart for providing a detailed explanation of the color management system shown in FIG. 6.

FIG. 7 is a flowchart for explaining one implementation of the color management system and color data file of the present invention as depicted in FIG. 6. In step S701, the source color data file according to the present invention is accessed, either from a separate memory area or from within a source color image file as depicted in FIG. 6. In step S702, the source device color characteristic data, such as device signal data and measured calorimetric data, is extracted along with the viewing condition data from the source color data file. As previously discussed, the measured calorimetric data is preferably in XYZ color space so as to provide compatibility with both current and future color management systems. An appropriate color management module for managing the color image data to be processed is selected in step S703. The color management module can be selected based on a preexisting embedded combination of color appearance space and color appearance model that are desired by a user, or based on the manner in which the color management module constructs a color transform.

Preferably, the color management module allows a user to select from one of many different color appearance spaces and from one of many different color appearance models to create a color transform for optimal color management results (S704). In step S705, a source color transform is constructed based on the color characteristic data and viewing condition data extracted from the source color data file, in addition to the color appearance space and color appearance model utilized by the color management module. Next, it is determined whether the user wishes to save the generated source color transform for future use (S706). If the source color transform is to be saved, it can be stored in a memory area such as a hard disk, floppy, CD-ROM or network server, as discussed above (S707), and flow then passes to step S708. If the source color transform is not to be saved, flow passes to step S708 in which it is determined whether or not to apply the source color transform to the source color image data. If the user wishes to apply the source color transform to the source color image data, the source color transform is applied to the source color image data in step S709 in order to create interim color image data.

As discussed above, the interim color image data is preferably in a profile connection space to facilitate further color management of the interim color image data. If the source color transform is not to be applied to the source color image data, flow passes to step S713 which is the end of the process. If the interim color image data is generated in step S709, flow passes to step S710 in which it is determined whether to apply a destination color transform on the interim color image data in order to generate destination color image data for rendering by a destination device, such as a printer. If a destination color transform is not to be applied, flow passes to the end in step S713. If, however, a destination color transform is to be applied, flow passes to step S711 in which a destination color transform is applied to the interim color image data, thereby generating destination color image data. As discussed above, a destination color transform may be accessed from a conventional destination device color profile which contains a destination color transform or, in the alternative, a destination color transform may be generated in the same manner as source color transform 68 of FIG. 6. In such a situation, a destination color data file similar to source color data file 63 is accessed and a destination color transform is generated in a manner similar to that described above with respect to steps S701 to S705. In either case, the destination color transform is applied in order to create destination color image data.

In step S712, the destination color image data is passed to the destination device, such as a printer, for rendering of a color image. Flow then passes to the end (step S713). In this manner, it can be appreciated that a subsequent user of an archived image file can select an appropriate color management module to construct a source color transform from the color characteristic and viewing condition data contained in the source color data file, thereby achieving preferred and/or optimal color management of the color image data.

Figure 8:
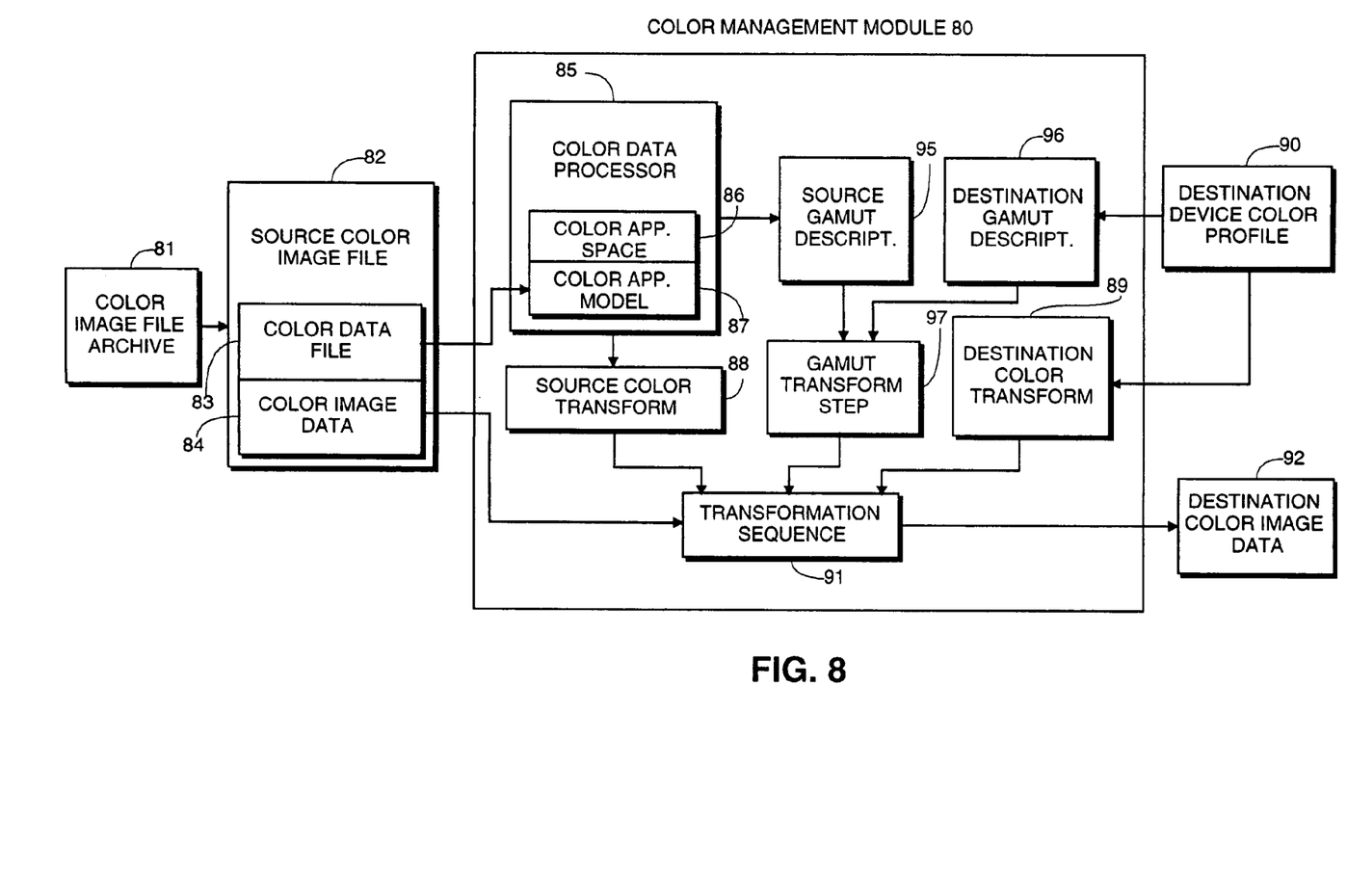
FIG. 8 is a detailed block diagram for providing an explanation of a color management system according to another embodiment of the present invention.

FIG. 8 provides a detailed block diagram for illustrating the use of a color data file in a color management system according to another embodiment of the present invention. In this embodiment, the color data file is used to construct a color transform which is incorporated into a comprehensive color transformation sequence for application to color image data. Turning to FIG. 8, it can be seen that source color image file 82 is accessed from color image archive 81 for use by a user. For example, a graphic artist may browse color image archive 81 and choose source color image file 82 corresponding to a color image that the graphic artist wishes to use in a composition image. Source color image file 82 contains source color data file 83 as described in FIG. 4 and also contains color image data 84. In this example, source color image file 82 corresponds to a scanner, and color image data 84 is in RGB color space.

Color management module 80 is then utilized for performing color management of color image data 84 contained in source color image file 82. Specifically, as discussed above, a subsequent user of source color image file 82 can select and/or control a preferred color management module depending on the color appearance space and color appearance model that the subsequent user wishes to apply to create a source color transform from color data file 83. As represented in FIG. 8, color data file 83 is passed to color transform generator 85 which is a function of color management module 80. Color data processor 85 utilizes color appearance space 86 and color appearance model 87 in order to construct source color transform 88 based on the device color characteristic data and viewing condition data contained in color data file 83 as depicted in FIG. 4.

In particular, device signal data represented by RGB data and measured calorimetric data represented by XYZ data from color data file 83 is accessed for use by color data processor 85. In addition, viewing condition data is accessed from color data file 83 to be used in conjunction with the device signal data and measured calorimetric data in order to generate source color transform 88 for transforming color image data 84 into color appearance space 86. In this example, color appearance space 86 is a profile connection space. In addition, color appearance model 87 is used to define source color transform 88. Source color transform 88 may be represented by a look-up table, and it can be appreciated that source color transform may be provided in other formats, such as a polynomial function, a single-variate transform, or a multi-variate transform. In addition, it can be appreciated that color appearance space 86 can be any one of a number of different types of color appearance spaces such as a CIE Lab color space, or a color space composed of a lightness component, and two orthogonal color components for defining a chroma and a hue, such as Jch and Jab color spaces. The present invention is not limited to the use of the aforementioned color appearance spaces, and it can be appreciated that other color appearance spaces may be used, including other forms of device-independent color spaces.

Color data processor 85 of color management module 80 generates source color transform 88 in accordance with a particular color transform generation method and/or algorithm. It can be appreciated that color management module 80 may implement any one of a different number of color transform generation methods and/or algorithms. Such color transform generation methods and/or algorithms may include one or more optimization functions for optimizing source color transform 88 to enable source color transform 88 to process color image data 84 in a more efficient fashion, to process color image data 84 so as to achieve greater accuracy in the reproduction of color image data 84, or to process color image data 84 to achieve a particular preferred reproduction of color image data 84.

Color data processor 85 also generates source gamut description 95 from source color data file 83. In this manner, source color data file 83 does not need to contain a separate gamut boundary description for the source device. In particular, the device signal data and measured calorimetric data are utilized to generate source gamut boundary description 95.

It can be appreciated that source color transform 88 can be applied to color image data 84, as depicted in FIG. 6; however, source color transform can alternatively be incorporated into a comprehensive color transformation sequence, thereby allowing source color image data 84 to be transformed into destination color image data 92. Source color transform 88 can be stored in a memory such as a floppy, hard disk, CD-ROM or the like for subsequent access and use. In the example illustrated in FIG. 8, destination color transform 89 is accessed and utilized in conjunction with source color transform 88 to create transformation sequence 91. Destination gamut description 96 is also accessed and used in conjunction with source gamut description 95 and a gamut boundary algorithm from color management module 80 to create gamut transform step 97. Gamut transform step 97 is then incorporated into transformation sequence 91. Transformation sequence 91 is then applied to color image data 84 to generate destination color image data 92 for rendering on a destination device, such as a printer. As discussed above, destination color transform 89 and destination gamut description 96 can be accessed from a typical destination device color profile 90. It can be appreciated that destination color transform 89 and destination gamut description 96 may alternatively be generated by color data processor 85 if a destination color data file similar to source color data file 83 exists for the particular destination device. In this example, destination device color profile 90 corresponds to an ink jet printer, and destination color transform 89 is used to transform color data into a CMYK color space.

Figure 9:
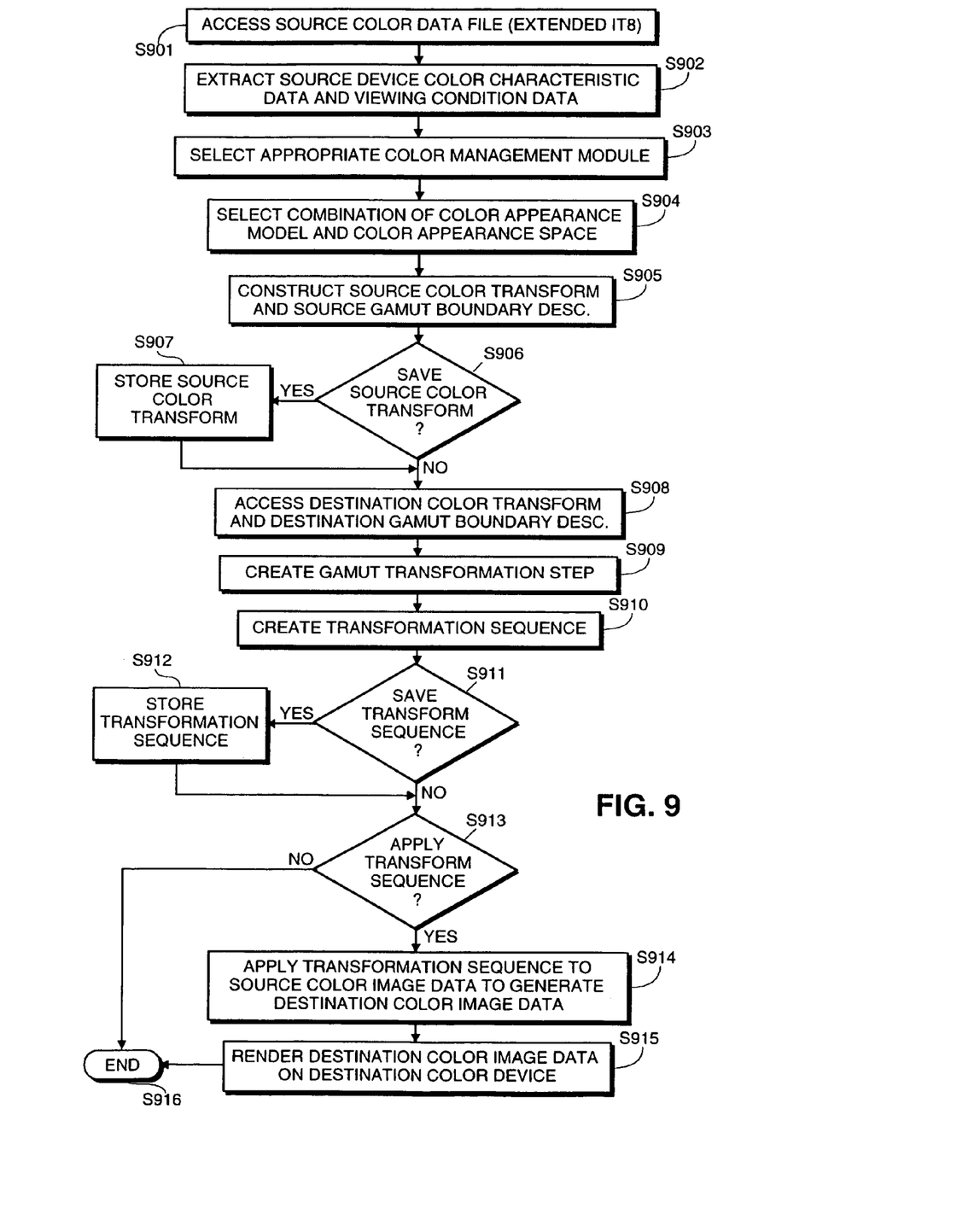
FIG. 9 is a flowchart for providing a detailed explanation of the color management system shown in FIG. 8.

FIG. 9 is a flowchart for explaining the color management system and color data file according to the embodiment of the present invention as depicted in FIG. 8. In step S901, the source color data file according to the present invention is accessed, either from a separate memory area or from within a source color image file as depicted in FIG. 8. In step S902, the source device color characteristic data, such as device signal data and measured calorimetric data, is extracted, in addition to the viewing condition data, from the source color data file. As previously discussed, the measured calorimetric data is preferably in XYZ color space so as to provide compatibility with both current and future color management systems. An appropriate color management module for managing the color image data to be processed is selected in step S903. The color management module can be selected based upon a preexisting embedded combination of color appearance space and color appearance model that are desired by a user, or can be selected based on the manner in which the color management module constructs a color transform.

Preferably, as depicted in step S904, the color management module allows a user to select from one of many different color appearance spaces and from one of many different color appearance models to create a color transform for optimal color management results. In step S905, a source color transform and a source gamut boundary description are constructed based on the color characteristic data and viewing condition data extracted from the source color data file, in addition to the color appearance space and color appearance model utilized by the color management module. Next, it is determined whether the user wishes to save the generated source color transform and/or source gamut boundary description for future use (S906). If the source color transform and/or source gamut boundary description is to be saved, it is stored in a memory area such as a hard disk, floppy, CD-ROM or network server, as discussed above (S907), and flow then passes to step S908.

Next, a destination color transform and a destination device gamut boundary description are accessed in step S908. As discussed above, the destination color transform and destination gamut boundary description may be accessed from a traditional device color profile or may be generated in the same manner as the source color transform and source gamut boundary description according to steps S901 to S905 above. The source and destination gamut boundary descriptions are then used in conjunction with a gamut mapping algorithm to create a gamut transformation step for inclusion into the transformation sequence (step S909). The source color transform, the destination color transform and the gamut transformation step are then incorporated into a transformation sequence in step S910. In this manner, a comprehensive color transformation sequence is created for efficient end-to-end processing of color image data. It is then determined in step S911 whether to save the transformation sequence for future use. If so, flow passes to step S912 in which the transformation sequence is stored in a memory, such as a floppy, hard disk, CD-ROM, network server or the like. In either case, flow passes to step S913 in which it is determined whether to apply the transformation sequence to the source color image data. If yes, the transformation sequence is applied to the source color image data to generate destination color image data in step S914. If not, flow passes to the end in step S916. If destination color image data was generated in step S914, the destination color image data is forwarded to the destination device for rendering of a color image (S915). Flow then passes to the end in step S916.

The present invention therefore provides a color data file for storing raw calorimetric measurement and device signal data corresponding to a source device in a standardized, format for subsequent use by a color management system to generate a source color transform. In this manner, a color management system is not forced to use a color transform that was originally created when the color image data was generated by the source device. A subsequent user of the color image data can then use a selected color management system having a preferred combination of a color space, a color appearance model and a desired set of viewing conditions in order to create a source device color transform. Accordingly, a source device color transform does not have to be created until the color image data is subsequently accessed for use by a subsequent user. In this manner, color image data is associated with a corresponding source color data file that contains color characteristic data and viewing condition data of the source device in a well recognized, robust format for use by a variety of current, and not yet known, color management systems.

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. A method for transforming source color image data depending on a source device into destination color image data depending on a destination device, comprising the steps of:

accessing a source color data file of the source device and a destination color data file of the destination device, the source and the destination color data file containing colorimetric data and corresponding device data;

constructing a source color transform based on the source color data file by using a source color transform constructing function;

constructing a destination color transform based on the destination color data file by using a destination color transform constructing function;

generating a source gamut boundary of the source device and a destination gamut boundary of the destination device;

constructing a gamut transform based on the source gamut boundary of the source device and the destination gamut boundary of the destination device;

incorporating the source color transform, the gamut transform and the destination color transform to generate an incorporated transform;

transforming the source color image data into the destination color image data by using the incorporated transform;

saving the source color transform for future use; and saving the incorporated transform for future use.

2. A method according to claim 1, wherein the source color data file includes viewing condition data and is transformed based on the viewing condition data by using a color appearance model.

3. A method according to claim 2, further comprising the step of:

selecting the color appearance model which a user desires.

4. A method according to claim 1, further comprising the step of:

saving the source gamut boundary.

5. A transforming apparatus for transforming source color image data depending on a source device into destination color image data depending on a destination device, comprising:

an accessor which accesses a source color data file of the source device and a destination color data file of the destination device, the source and the destination color data file containing colorimetric data and corresponding device data;

a source color transform constructor which constructs a source color transform based on the source color data file by using a source color transform constructing function;

a destination color transform constructor which constructs a destination color transform based on the destination color data file by using a destination color transform constructing function;

a generator which generates a source gamut boundary of the source device and a destination gamut boundary of the destination device;

a gamut transform constructor which incorporates a gamut transform based on the source gamut boundary of the source device and the destination gamut boundary of the destination device;

an incorporator which incorporates the source color transform, the gamut transform and the destination color transform to generate an incorporated transform;

a source color image data transformer which transforms the source color image data into the destination color image data by using the incorporated transform;

memory which saves the source color transform for future use; and memory which saves the incorporated transform for future use.

6. An apparatus according to claim 5, wherein the source color data file includes viewing condition data and is transformed based on the viewing condition data by using a color appearance model.

7. An apparatus according to claim 6, further comprising a selector which selects the color appearance model which a user desires.

8. An apparatus according to claim 5, further comprising memory for saving the source gamut boundary.

9. A computer-readable memory medium having computer-executable process steps stored thereon, wherein said process steps comprise:

an accessing step to access a source color data file of a source device and a destination color data file of a destination device, the source and the destination color data file containing colorimetric data and corresponding device data;

a constructing step to construct a source color transform based on the source color data file by using a source color transform constructing function;

a constructing step to construct a destination color transform based on the destination color data file by using a destination color transform constructing function;

a generating step to generate a source gamut boundary of the source device and a destination gamut boundary of the destination device;

a constructing step to construct a gamut transform based on the source gamut boundary of the source device and the destination gamut boundary of the destination device;

an incorporating step to incorporate the source color transform, the gamut transform and the destination color transform to generate an incorporated transform;

a transforming step to transform the source color image data into the destination color image data by using the incorporated transform;

a saving step to save the source color transform for future use; and a saving step to save the incorporated transform for future use.

10. A computer-readable memory medium according to claim 9, wherein the source color data file includes viewing condition data and is transformed based on the viewing condition data by using a color appearance model.

11. A computer-readable memory medium according to claim 10, wherein said process steps further comprise a selecting step to select the color appearance model which a user desires.

12. A computer-readable memory medium according to claim 9, wherein said process steps further comprise a saving step to save the source gamut boundary.

* * * * *